July 3, 1923.   1,460,530
R. P. BROWN ET AL
METHOD OF AND APPARATUS FOR MEASURING ELECTRICAL RESISTANCES
Filed Aug. 31, 1920   2 Sheets-Sheet 2
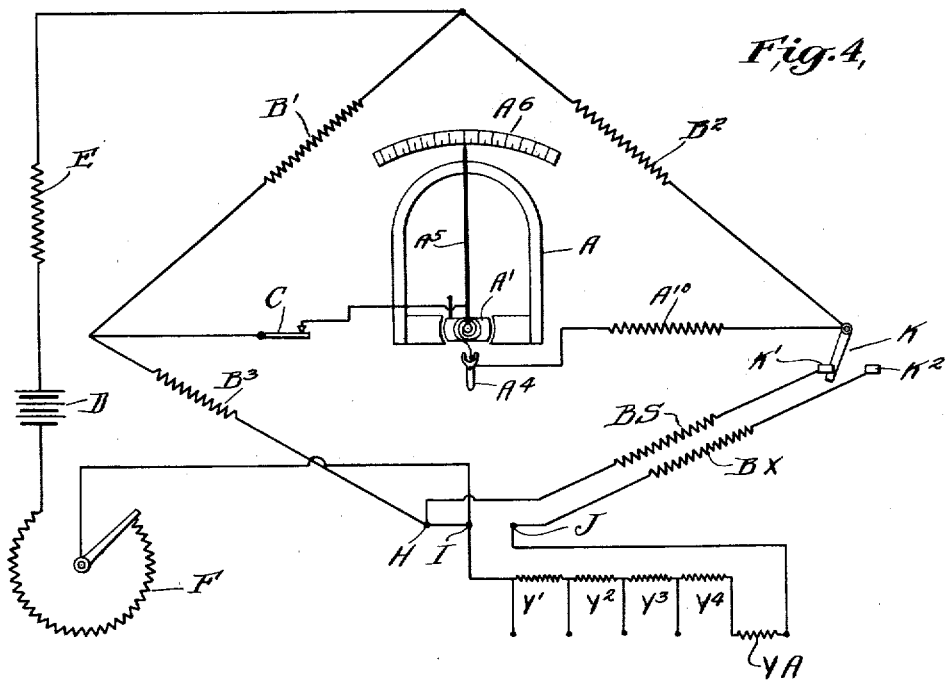
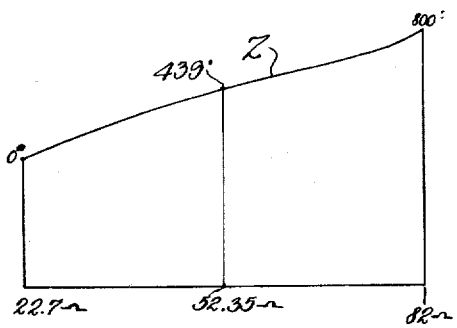
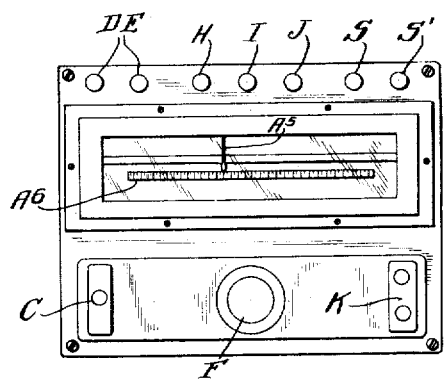
INVENTOR
Richard P Brown and
Charles P Frey
BY
John E. Hubbard
their ATTORNEY Patented July 3, 1923.

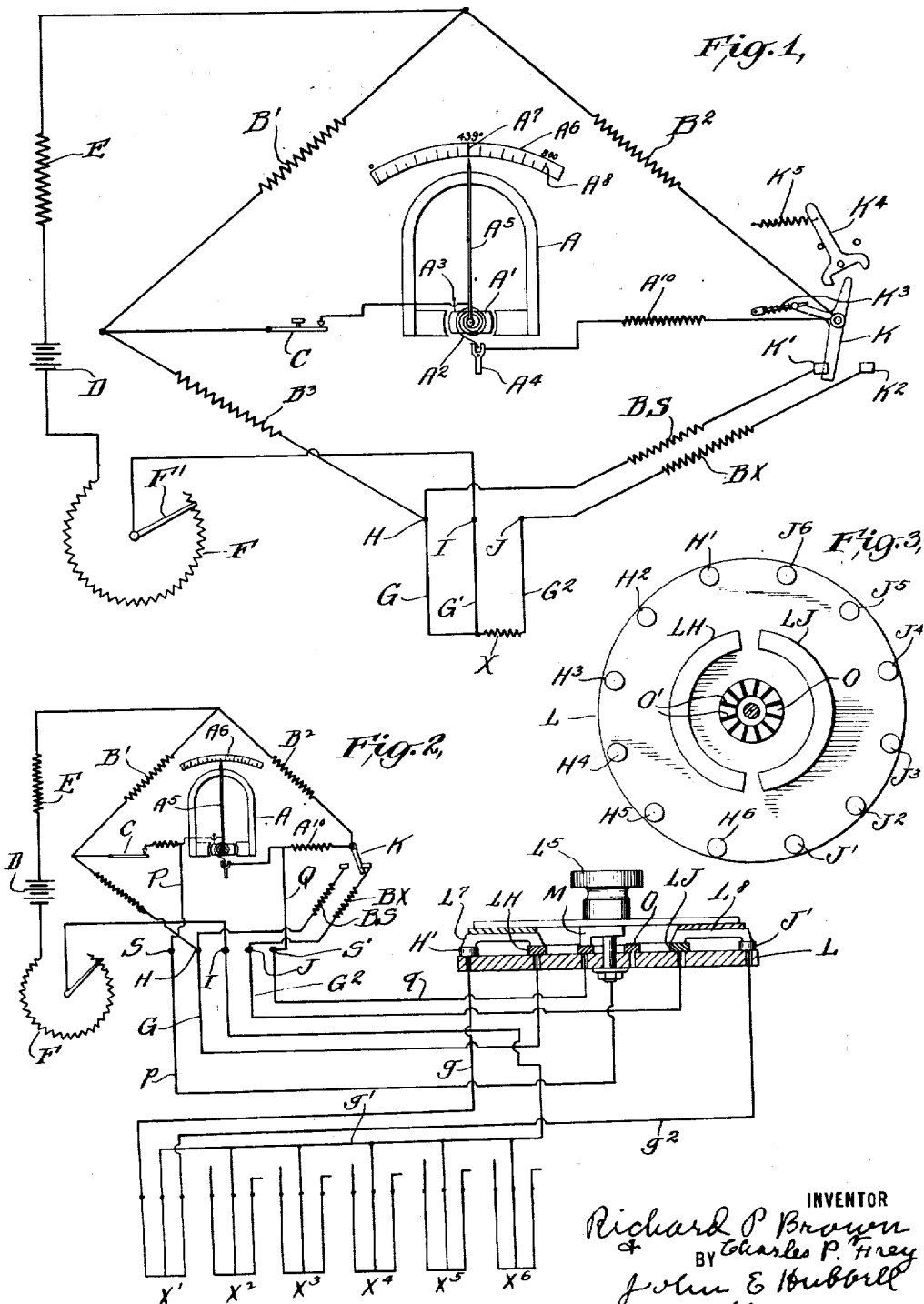

1,460,530

UNITED STATES PATENT OFFICE.

RICHARD P. BROWN AND CHARLES P. FREY, OF PHILADELPHIA, PENNSYLVANIA, ASSIGNORS TO BROWN INSTRUMENT COMPANY, OF PHILADELPHIA, PENNSYLVANIA, A CORPORATION OF PENNSYLVANIA.

METHOD OF AND APPARATUS FOR MEASURING ELECTRICAL RESISTANCES.

Application filed August 31, 1920. Serial No. 407,231.

*To all whom it may concern:*

Be it known that we, RICHARD P. BROWN and CHARLES P. FREY, citizens of the United States, and residents of Philadelphia, in the county of Philadelphia and State of Pennsylvania, have invented certain new and useful Improvements in Methods of and Apparatus for Measuring Electrical Resistances, of which the following is a specification.

Our present invention comprises improvements in methods of and apparatus for measuring electrical resistances by the use of a Wheatstone bridge circuit and a deflecting galvanometer which indicates the extent of the resistance variations by the amounts which the galvanometer needle is deflected from a neutral or zero position in distinction to the null method in which measurements are secured by adjusting known resistances in the bridge circuit until the galvanometer needle assumes its zero or no current position.

The general object of the invention is to provide simple and effective methods and apparatus adapted for commercial, as distinguished from purely laboratory use, and capable of giving highly accurate measurements without requiring the use of standard cells or analogous means for impressing a known and constant E. M. F. on the energizing circuit of the apparatus. The invention is of special utility in, and in some of its aspects consists in improvements in methods of and apparatus for measuring temperatures by means of resistance thermometers.

The various features of novelty which characterize our invention are pointed out with particularity in the claims annexed to and forming a part of this specification. For a better understanding of our invention, its advantages, and specific objects attained by its use, reference should be had to the accompanying drawings and descriptive matter in which we have illustrated and described preferred forms and modes of carrying out the invention.

Of the drawings:—

Fig. 1 is a diagram illustrating one arrangement for indicating the temperature to which a resistance thermometer is subjected;

Fig. 2 is a diagram illustrating an apparatus especially devised for successively indicating the temperatures to which a plurality of resistance thermometers are subjected;

Fig. 3 is a plan view of a portion of the apparatus shown diagrammatically in Fig. 2;

Fig. 4 is a diagrammatic representation of apparatus especially devised for use as an indicating ohmmeter to measure unknown resistance;

Fig. 5 is a diagram illustrating a characteristic feature of our invention; and

Fig. 6 is an elevation of a commercial form of indicating instrument suitable for use as a part of the apparatus illustrated diagrammatically in Figures 1, 2 and 4.

In the drawings, and referring first to the arrangement shown diagrammatically in Fig. 1, A represents a deflecting galvanometer of conventional type connected in circuit between an opposing pair of arm junctions of a Wheatstone bridge circuit of which $B^1$, $B^2$, and $B^3$ represent fixed resistances in three arms of the bridge, and in which the fourth arm of the bridge normally includes either a calibrating resistance BS or the resistance X to be measured. The energizing circuit for the bridge includes a source of current D and a rheostat F. In ordinary practice the source of current will consist of three or four dry cells and ordinarily the energizing circuit will also include a dead or ballast resistance E. One end of the energizing circuit is connected to the junction of the bridge arms including the resistances $B^1$ and $B^2$, and the other end of the energizing circuit is connected to the junction between the bridge arms including the resistance $B^3$ and the fourth arm of the bridge.

The galvanometer A may be of any usual or suitable type of sensitive deflecting galvanometer in which the neutral or zero position of the galvanometer needle $A^5$ is at the center of the galvanometer scale $A^6$ so that the needle will be deflected from the zero position in one direction or the other according to the direction of current flow through the galvanometer. It is important that the galvanometer should be provided with a zero adjusting device. In the particular construction diagrammatically illustrated the galvanometer is a milliammeter having a stationary field magnet and a movable element $A^1$ comprising a winding, the terminals of which are oppositely coiled spiral conductors $A^2$ and $A^3$. The outer end of the conductor $A^3$ is fixed, but the outer end of the conductor $A^2$ is connected to and may be adjusted by a lever $A^4$ to thereby adjust the zero of the instrument. The galvanometer circuit includes a dead or ballast resistance $A^{10}$ which, like the resistances $B^1$, $B^2$, $B^3$ and BS and the resistance BX hereinafter referred to, should be formed of material which does not vary in resistance on variations in the temperature to which it is subjected. The galvanometer circuit preferably includes a normally closed key C which may be opened to thereby open the galvanometer circuit when this is desirable.

As shown in Fig. 1, the resistance X to be measured is the exploring coil, or variable resistance element of a "bulb" employed as a resistance thermometer and having the usual compensating leads G, $G^1$ and $G^2$. The latter are shown as connected to the instrument binding posts H, I and J. The end of the resistance $B^2$ remote from the resistance $B^1$ is connected to the binding post H, and the corresponding terminal of the bridge energizing circuit is connected to the binding post I. One terminal of the calibrating resistance BS is connected to the binding post H and the other terminal is connected to a switch contact $K^1$. A cooperating switch contact $K^2$ is connected to the binding post J, usually as shown, through a dead or ballast resistance BX the purpose of which is hereinafter explained. K represents a switch by which the arm of the bridge containing the resistance $B^2$ may be connected either to the switch contact $K^1$ or to the switch contact $K^2$. Preferably the switch mechanism K is of the known type in which the switch lever is shifted back and forth between the contacts $K^1$ and $K^2$ with a snap action, and preferably also, the switch mechanism includes provisions for normally maintaining the switch lever in engagement with contact $K^1$. In the known type of switch mechanism of this character conventionally illustrated, the switch lever is provided with a throwover spring $K^3$ for giving the desired snap action movement in each direction to the switch lever, and the latter is actuated by a pivoted handle $K^4$ normally held by a spring $K^5$ in the position in which the switch lever engages the contact $K^1$.

The purpose of using a switch mechanism K in which the switch lever is shifted from either of its two operative positions into the other by a snap action, is to effect a replacement in the bridge circuit of the calibrating resistance by the resistance to be measured or vice-versa, so quickly as to avoid subjecting the movable element of the instrument to a force which will slam the instrument needle $A^5$. By arranging the switch mechanism so that the calibrating resistance is normally in circuit and the needle of the galvanometer is thereby normally maintained at one limit of its swing, any failure of the energizing circuit to supply the proper E. M. F. to the bridge circuit is made plainly noticeable which would not be the case if the normally inactive position of the needle $A^5$ were in its neutral or central position.

The apparatus shown in Fig. 1 is calibrated by adjusting the switch arm $F^1$ of the rheostat F as required to maintain the needle $A^5$ of the galvanometer in register with the scale mark $A^6$ located at one end, and preferably at the high resistance end of the scale $A^6$ where the switch lever is in contact with the contact $K^1$, and the calibrated resistance BS is thus connected in the bridge circuit. The zero of the instrument may be tested from time to time by depressing the key C, thus opening the galvanometer circuit. If the needle does not then register with the zero mark $A^7$ of the scale, the lever $A^4$ is adjusted as required to produce such registration.

With the apparatus properly calibrated, the resistance X may be measured by manipulating the switch handle $K^4$ to shift the switch lever into engagement with the switch contact $K^2$, thereby cutting the calibrating resistance BS out of the bridge circuit, and connecting the resistance X into the bridge circuit. Provided the sum of the resistance X, the resistance of its leads, and the ballast resistance BX, if the latter be employed, is within the scale range of the apparatus, then the value of the resistance X can be determined by the deflection of the galvanometer needle $A^5$ with a high degree of accuracy provided the apparatus is proportioned and arranged in accordance with the principles which we now explain.

The bridge resistance $B^1$, $B^2$, and $B^3$, are preferably all equal to one another, and each is a high resistance, and by the term "high resistance" as used herein we mean a resistance which ordinarily is at least five times the resistance variation to be measured, and consequently at least five times the resistance scale range of the instrument. In ordinary practice, the resistance scale range of the instrument will be not more than 100 ohms and the value of each of the resistances $B^1$, $B^2$ and $B^3$ will be about 500 ohms. The importance of the proportion stated and other characteristics of the invention may be made clearer by the following concrete illustration.

A particular thermometer resistance X formed of a nickel alloy and adapted for use in the arrangement shown in Fig. 1 in measuring temperatures over a range from 0° to 800° F. has a resistance of 22.7 ohms at a temperature of 0°F., and a resistance of 82 ohms at 800° F. With the apparatus in Fig. 1 proportioned and adjusted so that the scale $A^6$ will indicate a temperature range from 0° F. to 800° F., with the particular resistance X referred to, the resistance scale range of the instrument will then be $82 - 22.7 = 59.3$ ohms. If the resistances $B^1$, $B^2$ and $B^3$ are 500 ohms each, the value of the calibrating resistance should be 500 ohms plus one half the resistance scale range, or 529.65 ohms, to bring the galvanometer needle to the 800° F. scale mark, $A^8$, when the calibrating resistance BS is connected in circuit. The ballast resistance BX should then be equal to 500 ohms less the sum of the lead resistances and 52.35 ohms which is the resistance of X when the latter is at the temperature corresponding to the zero position scale mark $A^7$. The lead resistance will depend upon the length of the leads and their character, but if the leads G, $G^1$ and $G^2$ are of ordinary character and not more than 1000 feet long which will be their maximum length in ordinary practice, the lead resistances will not exceed 2½ ohms, and no appreciable error will be made if the resistance BX is fixed on the assumption that the lead resistance averages 1¼ ohms. On this assumption the resistance BX should be 446.4 ohms. The ballast resistance $A^{10}$ of the galvanometer circuit should be as near as may be that which is required to make the resistance of the galvanometer circuit 500 ohms, though a ten or twenty per cent variation in this resistance to secure the desired instrument scale range will not produce an appreciable error.

With the stated relative values of the bridge resistances, the lead resistances and the resistance variations to be measured, it will be apparent to those skilled in the art that the variation in lead resistances which may exist in practice will not cause an error greater than one-fortieth of one per cent in the readings, which is smaller than the error to be expected in reading the instrument indications. The resistance proportions specified also render negligible the error due to the fact that, when the calibrating resistance BS is in circuit, the energizing circuit for the bridge includes both leads G and $G^1$, since the binding post H is then the arm junction of the bridge circuit, while with the resistance X in circuit, the energizing circuit as distinguished from the bridge circuit includes only the lead $G^1$, since the arm junction of the bridge is then at the point at which the lead $G^1$ is connected to the resistance X.

The use of high and approximately equal resistances in the bridge arms and galvanometer circuits gives maximum sensitiveness and reduces the current flow through the galvanometer circuit to a very small value. For example, the current flow through the galvanometer may well be less than one ten thousandth of an ampere for a full scale deflection.

The location of the electrical zero of the instrument at the center of the scale instead of at one end tends to reduce the instrument errors and is especially important in resistance thermometry when the "bulb" resistance does not vary in linear proportion with the temperature to which it is subjected as is the case with the nickel and nickel alloy resistances. For example, the particular nickel alloy resistance referred to above varies in resistance with changes in its temperature as indicated by the curve Z in the diagram shown in Fig. 5 wherein the abscissæ represent resistances and the ordinates represent temperatures. As this diagram indicates, the temperature at the electrical zero of the instrument when the resistance X is 52.35 ohms is approximately 439° F., and if the instrument scale is graduated in degrees F. as shown in Fig. 1, the scale mark $A^7$ corresponds not to 400° F. but to 439° F.

In many cases it is desirable to employ the same resistance measuring apparatus for successively measuring a plurality of different resistances, as for example, in determining the temperatures in different furnace chambers of different apartments of a building. This may be accomplished by the use of a suitable switch mechanism for successively connecting the different resistances to be measured to the measuring apparatus proper. To permit the different resistances to be cut into and out of the measuring circuit in rapid succession without subjecting the movable element of the galvanometer to forces tending to slam the pointer, we make provisions in the switch mechanism employed for rendering the galvanometer inoperative during the periods in which one resistance to be measured is being replaced by another in the measuring circuit. The galvanometer may thus be rendered inoperative by opening the galvanometer circuit, but in practice we prefer for this purpose to short circuit the movable winding of the galvanometer.

In the preferred form of apparatus for this purpose shown in Figs. 2 and 3, $X^1$, $X^2$, $X^3$, $X^4$, $X^5$, and $X^6$, represent thermometer resistance or bulbs which may be successively connected by means of a switch L to the binding posts H, I and J of the measuring apparatus shown in Fig. 2 which is shown as identical with that shown in Fig. 1 except as hereinafter explained. The switch L as shown comprises two semi-circular conducting arcs LH and LJ mounted on a suitable insulating base and connected respectively to the leads G and $G^2$ running to the binding posts H and J. One terminal of the resistance conductor $X^1$ is connected by a lead $g^2$ to a switch stud $J^1$ and the similar terminals of the resistance $X^2$, $X^3$, $X^4$, $X^5$ and $X^6$ are connected to corresponding switch studs $J^2$, $J^3$, $J^4$, $J^5$ and $J^6$ all arranged alongside the conducting arc LJ and similarly spaced apart from one another. Another terminal of the resistance $X^1$ is connected by a lead $g$ to a switch stud $H^1$, and the corresponding terminals of the resistance $X^2$, $X^3$, $X^4$, $X^5$ and $X^6$ are connected to corresponding switch stud $H^2$, $H^3$, $H^4$, $H^5$ and $H^6$ all arranged alongside the arc LH in a regularly spaced series. The intermediate or battery terminals of the resistances $X^1$, $X^2$, $X^3$, $X^4$, $X^5$ and $X^6$ are each connected by a corresponding lead $g^1$ to the main lead $G^1$ running to the instrument binding post I. The movable element $L^5$ of the switch L comprises a rotating knob or handle and conducting parts $L^7$ and $L^8$ connected thereto and so arranged that in one setting of the switch, the conducting part $L^7$ connects the stud $H^1$ to the arc shaped conductor LH and the conducting part $L^8$ connects the stud $J^1$ to the arc shaped conductor LJ, while in a second setting of the switch the studs $H^2$ and $J^2$ are connected to the conductors LH and LJ respectively, and so on.

To short circuit the galvanometer as the switch L is being adjusted from one position to another we provide the instrument proper with binding posts S and $S^1$ from which run conductors P and Q to the opposite terminals of the winding of the movable element of the galvanometer, and we provide the rotatable element $L^5$ of the switch L with a switch contact M connected by a conductor $p$ to the binding post S. The switch contact M sweeps over an annular body O of conducting material which is connected by the conductor Q to the binding post $S^1$. Embedded in the face of the conducting part O are a series of radial pieces $O^1$ of insulating material so arranged that when the outer ends of the switch contact members $L^7$ and $L^8$ are centered over any corresponding pair of switch studs $H^1$, $J^1$, $H^2$, $J^2$, $H^3$, $J^3$, etc., the switch contact M will engage a corresponding insulating strip $O^1$, while in all other positions of the parts $L^7$ and $L^8$ the switch contact M will engage the metallic surface of the conducting part O and thereby short circuit the winding of the galvanometer.

Measuring apparatus of the type shown in Fig. 1 is well adapted for use as an indicating ohmmeter. In measuring resistances which may vary in value beyond the resistance scale range of the indicating instrument proper, we provide a suitable ballast or auxiliary resistance $Y^1$, $Y^2$, $Y^3$, $Y^4$ as shown in Fig. 4. If the resistance scale range of the apparatus shown in Fig. 4 is assumed to be 100 ohms, and the resistance $Y^1$, $Y^2$, $Y^3$ and $Y^4$ are each of 100 ohms, then if the resistance YA to be measured does not exceed 100 ohms its resistance can be measured by connecting it in series with resistances $Y^1$, $Y^2$, $Y^3$ and $Y^4$. If the resistance YA to be measured is between 100 and 200 ohms, the resistance is then connected in series with the resistances $Y^1$, $Y^2$ and $Y^3$, and so on. When the resistance to be measured is between 400 and 500 ohms it is connected directly in the bridge circuit and none of the resistances $Y^1$, $Y^2$, $Y^3$ and $Y^4$ are then employed.

In Fig. 6 we have shown a commercial type of instrument suitable for use in the arrangements shown in Figs. 1, 2, 3 and 4. The instrument proper advantageously includes the galvanometer, switches C and K, the bridge and calibrating resistances $B^1$, $B^2$, $B^3$ and BS, the rheostat F and may also include the ballast resistance BX. When intended for use as a portable instrument, the instrument casing may also house the source of current D and ballast resistance E, but when intended for use as a wall instrument these elements may advantageously be located outside of the instrument. In the use of the apparatus illustrated in Figs. 1 and 4, the binding posts S and $S^1$ are not used, and in the use of the apparatus as an indicating ohmmeter illustrated in Fig. 4, the binding posts H and I may be directly connected as shown. The switch mechanism L will not ordinarily be mounted in the case of the measuring instrument proper.

While in accordance with the provisions of the statutes we have illustrated and described the best forms of our invention now known to us, it will be apparent to those skilled in the art that formal changes may be made in the apparatus and methods disclosed without departing from the spirit of our invention as set forth in the appended claims, and that some features of our invention may sometimes be used to advantage without the corresponding use of other features.

Having now described our invention, what we claim as new and desire to secure by Letters Patent, is:

1. In apparatus for successively measuring the resistance of a plurality of resistance elements comprising a Wheatstone bridge circuit, means for establishing a potential difference between one pair of bridge leg junctions, a deflecting galvanometer connected between the other pair of bridge leg junctions, the improvement which consists in switch mechanism for successively cutting the different resistances into and out of the bridge circuit and including provisions for rendering the galvanometer inoperative during the period in which one resistance is being replaced by the other.

2. Apparatus for measuring a resistance, comprising in combination, a Wheatstone bridge circuit, a deflecting galvanometer connecting opposed leg junction points of the bridge, a source of current connected between the other two bridge leg junctions, a calibrating resistance, a quick acting switch for quickly connecting either the calibrating resistance or the resistance to be measured into the bridge circuit and simultaneously disconnecting the other of said two resistances from the bridge circuit, and means tending to hold said switch in the position in which the calibrating resistance is in the bridge circuit and the resistance to be measured is out of the circuit.

3. Apparatus for measuring a resistance comprising in combination, a wheatstone bridge circuit, a deflecting galvanometer connecting opposed leg junction points of the bridge, a source of current connected between the other two bridge leg junctions, a calibrating resistance, and a quick acting switch mechanism for quickly connecting either the calibrating resistance or the resistance to be measured into the bridge circuit and simultaneously disconnecting the other of said two resistances from the bridge circuit.

4. In apparatus for successively measuring the resistances of a plurality of resistance elements comprising a Wheatstone bridge circuit, means for establishing a potential difference between one pair of bridge leg junctions, a deflecting galvanometer connected between the other pair of bridge leg junctions, the improvement which consists in a switch mechanism for successively cutting the different resistances into and out of the bridge circuit and including provisions for short circuiting the galvanometer during the period in which one resistance is being replaced by another in the bridge circuit.

Signed at Philadelphia in the county of Philadelphia and State of Penna., this eighteenth day of August A. D. 1920.

RICHARD P. BROWN.
CHARLES P. FREY.